United States Patent
Kitada et al.

(10) Patent No.: US 6,875,810 B2
(45) Date of Patent: Apr. 5, 2005

(54) AQUEOUS DISPERSIONS OF POLYURETHANE RESINS AND AQUEOUS ADHESIVES

(75) Inventors: Mitsuru Kitada, Osaka-fu (JP); Kazuo Kuba, Osaka-fu (JP); Yutaka Hashimoto, Osaka-fu (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 09/983,351

(22) Filed: Oct. 24, 2001

(65) Prior Publication Data

US 2002/0077413 A1 Jun. 20, 2002

(30) Foreign Application Priority Data

Oct. 25, 2000 (JP) .................................... P. 2000-325378

(51) Int. Cl.⁷ .............................. C08J 3/00; C08K 3/20; C08L 75/00
(52) U.S. Cl. ........................ 524/591; 524/839; 524/840
(58) Field of Search ................................ 524/591, 839, 524/840

(56) References Cited

U.S. PATENT DOCUMENTS

| 3,036,998 A | 5/1962 | Rudner et al. ............. 260/77.5 |
| 3,756,992 A | 9/1973 | Dieterich et al. ........... 117/123 |
| 5,703,158 A | * 12/1997 | Duan et al. ................. 524/840 |

FOREIGN PATENT DOCUMENTS

| JP | 59-30186 | 7/1984 |
| JP | 2894494 | 3/1999 |

* cited by examiner

Primary Examiner—Patrick D. Niland
(74) Attorney, Agent, or Firm—Armstrong, Kratz, Quintos, Hanson & Brooks, LLP

(57) ABSTRACT

An aqueous dispersion of a polyurethane resin obtainable from compounds including: (A) an organic polyisocyanate; (B) a polyester polyol containing an aromatic metal sulfonate group; (C) an aliphatic polyol being free from aromatic metal sulfonate and having a hydroxyl value of from 10 to 350; and (D) at least one of a polyamine and a polyol each having a molecular weight of 300 or lower, wherein the content of said aliphatic polyol unit (C) amounts to at least 55% by weight based on the solid content of said polyurethane resin. Also disclosed is an aqueous adhesive comprising the polyurethane resin aqueous dispersion.

4 Claims, No Drawings

AQUEOUS DISPERSIONS OF POLYURETHANE RESINS AND AQUEOUS ADHESIVES

FIELD OF THE INVENTION

This invention relates to an aqueous dispersion of a polyurethane resin which is suitable for use as, mainly, an aqueous adhesive, and to the use thereof as an adhesive. More particularly, the invention relates to an aqueous dispersion of a polyurethane resin and an aqueous adhesive using the same which are suitable for or as an aqueous adhesive because of having long tack-free time (open time), enabling adhesion at a reactivation temperature of 50 to 60° C. after the application onto a base material, and being excellent in adhesive strength and heat resistance.

BACKGROUND OF THE INVENTION

In adhesion of base materials such as rubbers, leathers, metals, plastics such as polyvinyl chloride (PVC), foamed materials or fibers with the use of aqueous polyurethane solutions or dispersions, it is generally considered that the tack-fee time (open time) of the adhesives is a very important factor in addition to the adhesive strength and the durability.

To bond base materials on which an adhesive in the form of an aqueous dispersion is applied, it is required to employ a so-called reactivation step of drying at, for example, about 50 to 60° C. after applying the adhesive to the base materials so as to remove the moisture and achieve the adhesive performance. In case where the time taken from the reactivation step to the bonding of the base materials having the adhesive applied thereon is too long, there arises a problem that the adhesive surface loses its tackiness and thus achieves only insufficient adhesive performance. The tack-free time (open time) of an adhesive is largely affected by the environmental temperature and the surface temperature of base materials in the application and bonding steps. In case where the environmental temperature and the surface temperature of the base materials are low, the tack-free time (open time) is liable to be shortened. At higher temperatures, on the contrary, the tack-free time (open time) is liable to be prolonged.

Accordingly, it has been strongly required to provide adhesives which are little affected by the environmental temperature and the base material surface temperature in bonding various materials such as shoes and rubber shoes, have a long tack-free time (open time) allowing to take a sufficient time from reactivation to bonding, and yet are excellent in adhesive strength and durability.

Methods of producing aqueous dispersions of polyurethane resins are described in U.S. Pat. Nos.3,036,998, 3,756, 992, etc.

Further, JP-B-59-30186 (The term "JP-B" as used herein means an "examined Japanese patent publication") discloses polyurethane resins obtained from amorphous polyester polyols having metal sulfonate group with polyisocyanate compounds. It is described in this document that when applied on polyethylene terephthalate films, the polyurethane resins produced by the above method showed improved adhesiveness, water resistance, etc.

Although polyester polyols having metal sulfonate group are used in the adhesives comprising the aqueous dispersions of the polyurethane resins as described above, this component mainly comprises aromatic polyester polyols. Thus, these adhesives have a high reactivation temperature of 100° C. or above and the adhesion should be carried out under heating to a high temperature. In case of using in adhering or bonding general base materials such as shoes and rubber, therefore, the adhesives have a short tack-free time (open time) and suffer from a fear of damaging the base materials by heat, thereby failing to achieve any sufficient performance.

Japanese Patent No. 2,894,494 discloses a process for producing aqueous solutions or dispersions of polyisocyanate polyaddition compounds having carboxylate and/or sulfonate as hydrophilic group(s). It is described in this patent that reactivation of these adhesives applied to base materials can be carried out by treating at a low temperature. However, these adhesives suffer from a problem of having a short tack-free time (open time), which is an important factor in application properties of adhesives, and only unsatisfactory adhesive performance such as adhesive strength.

SUMMARY OF THE INVENTION

An object of the invention is to solve the above-described problems and to provide an aqueous dispersion of a polyurethane resin which has a relatively longer tack-free time (open time) than the conventional ones and thus can be reactivated at low temperatures of, for example, 50 to 60° C., and which is also excellent in adhesive strength and heat resistance.

Another object of the present invention is to provide an aqueous adhesive comprising the aqueous dispersion.

Other objects and effects of the present invention will become apparent from the following description.

As the results of extensive studies to solve the above-described problems, the inventors have found out that when aqueous dispersions of specific polyurethane resins as will be described below are used as adhesives, the adhesives have a long tack-free time and, therefore, can be reactivated at low temperatures of, for example, 50 to 60° C., and yet are excellent in adhesive strength and heat resistance, thereby completing the invention.

That is, the above-described objects of the present invention have been achieved by providing an aqueous dispersion of a polyurethane resin obtainable from compounds including:

(A) an organic polyisocyanate;

(B) a polyester polyol containing an aromatic metal sulfonate group;

(C) an aliphatic polyol being free from aromatic metal sulfonate and having a hydroxyl value of from 10 to 350; and (D) at least one of a polyamine and a polyol each having a molecular weight of 300 or lower, wherein the content of said aliphatic polyol unit (C) amounts to at least 55% by weight based on the solid content of said polyurethane resin.

The present invention also provides an aqueous adhesive comprising the polyurethane resin aqueous dispersion.

DETAILED DESCRIPTION OF THE INVENTION

The invention is described in more detail below.

The organic polyisocyanate (A) to be used in preparing the aqueous dispersion of the polyurethane resin according to the invention is represented by the following general formula:

R(NCO)$_n$ wherein R represents an arbitrary organic compound containing carbon, and n is 2 or more.

As the organic polyisocyanate compound, use can be made of any publicly known ones. Typical examples thereof include 1,4-tetramethylene diisocyanate, 1,6-hexamethylene diisocyanate, 1,12-dodecamethylene diisocyanate, cyclohexane-1,3- or 1,4-diisocyanate, 1-isocyanato-3-isocyanatomethyl-3,5,5-trimethylcyclohexane (also called isophorone diisocyanate, hereinafter referred to as IPDI), bis-(4-isocyanatocyclohexyl)methane (hereinafter referred to as hydrogenated MDI), 2- or 4-isocyanatocyclohexyl-2'-isocyanatocyclohexylmethane, 1,3- or 1,4-bis (isocyanatomethyl)-cyclohexane, bis-(4-isocyanato-3-methylcyclohexyl)methane, 1,3- or 1,4-α, α, α', α'-tetramethylxylylene diisocyanate, 2,4- or 2,6-diisocyanatotoluene, 2,2'-, 2,4'- or 4,4'-diisocyanatodiphenylmethane (hereinafter referred to as MDI), 1,5-naphthalene diisocyanate, p- or m-phenylene diisocyanate, xylylene diisocyanate and diphenyl-4,4'-diisocyanate.

Among these compounds, it is preferable to use aromatic diisocyanate compounds from the viewpoints of mechanical property. It is still preferable to use aliphatic or alicyclic diisocyanate compounds from the viewpoints of durability, light resistance, etc. From the viewpoint of enabling the acquisition of linear polyurethane resins having more appropriate heat activation properties and durability, it is also preferable to use bifunctional or lower polyisocyanates. However, use may be made of trifunctional or higher polyisocyanate compounds, so long as the adhesive properties are not worsened thereby.

The isocyanate content preferably ranges from 8 to 25% by weight based on the solid content of the final aqueous urethane resin. When the isocyanate content falling within this range, the cohesive force of polyurethane molecules can be controlled within an appropriate range and thus reactivation can be preferably effected at a low temperature without any delay in the expression of the initial strength.

The polyester polyol containing aromatic metal sulfonate group (B) can be obtained by, for example, reacting a dicarboxylic acid containing aromatic metal sulfonate group or its ester derivative with a polyol having a molecular weight of 300 or lower, though the invention is not restricted thereto.

It is preferable to further use a sulfonate-free polycarboxylic acid and/or cyclic ester as reactant(s), since the solubility of the resin in a solvent can be elevated thereby.

As the dicarboxylic acid containing aromatic metal sulfonate group, dicarboxylic acids such as 5-sulfoisophthalic acid, sulfoterephthalic acid, 4-sulfophthalic acid and 5[4-sulfophenoxy]isophthalic acid and ester derivatives thereof containing metals such as Na, K, Li and Ca may be cited.

Examples of the polyol having a molecular weight of 300 or lower include aliphatic diols such as ethylene glycol, propylene glycol, 1,3-propanediol, 1,3-butanediol, 1,4-butanediol, 1,5-pentanediol, 1,6-hexanediol, neopentyl glycol, diethylene glycol, triethylene glycol, tetraethylene glycol, dipropylene glycol, tripropylene glycol, polyethylene glycol, 3-methyl-1,5-pentanediol and 2-butyl-2-ethyl-1,3-propanediol, alicyclic diols such as 1,4-cyclohexanediol, 1,4-cyclohexane dimethanol and hydrogenated bisphenol A, diols such as bisphenol A, hydroquinone, bishydroxyethoxybenzene and alkylene adducts thereof, and polyols as polyfunctional components such as glycerol, trimethylolpropane and pentaerythritol.

Examples of the sulfonate-free polycarboxylic acid or its ester derivative include sulfonate-free aromatic dicarboxylic acids such as terephthalic acid, isophthalic acid, phthalic acid, 1,4-naphthalenedicabroxylic acid, 2,5-naphthalenedicarboxylic acid, 2,6-naphthalenedicarboxylic acid, naphthalic acid, biphenyldicarboxylic acid and 1.2-bis (phenoxy)ethane-P,P'-dicarboxylic acid and acid anhydrides and ester-forming derivatives thereof, and aromatic hydroxycarboxylic acids such as p-hydroxybenzoic acid and ester-forming derivatives thereof.

Examples of the sulfonate-free aliphatic (alicyclic) dicarboxylic acid include aliphatic dicarboxylic acids such as succinic acid, adipic acid, azelaic acid, sebacic acid, maleic anhydride and fumaric acid, alicyclic dicarboxylic acids such as 1,4-cyclohexanedicarboxylic acid and anhydrides and ester-forming derivatives thereof. As the polyfunctional component, polycarboxylic acids such as trimellitic acid, pyromellitic acid and cyclohexanetricarboxylic acid and anhydrides and ester-forming derivatives thereof may be cited.

As the cyclic ester, ε-caprolactone, γ-valerolactone and the like may be cited. Because of being commonly usable and available, ε-caprolactone is particularly preferable therefor.

By selecting an arbitrary polyol and introducing a cyclic ester having a favorable water resistance into the above-described polyester polyol having aromatic metal sulfonate, the water resistance, heat resistance, cohesive force, etc. of the aqueous polyurethane resin dispersion can be arbitrarily controlled.

In applying an adhesive to various base materials, it is generally considered, from the viewpoint of working properties, that a tack-free time (open time) of at least 3 minutes is needed. It is also needed that the adhesive shows a high adhesive strength immediately after bonding and an excellent heat resistance and the like. Generally speaking, aqueous polyurethane resin dispersions designed to give a prolonged tack-free time (open time) would be poor in cohesive force, crystallinity and initial heat resistance and a worsened adhesive strength in many cases.

In contrast thereto, the polyester polyol containing aromatic metal sulfonate group (B) imparts rigidity to the polyurethane molecule owing to the aromatic ring in the main chain and, at the same time, partly regulates the cohesive force among the urethane molecular chains owing to its steric structure. Therefore, the introduction of the above-described polyester polyol having aromatic metal sulfonate group into the polyurethane molecule makes it possible not only to prolong the tack-free time (open time) as an adhesive but also to impart the cohesive force and the rigidity.

Because of being an aromatic acid ester, moreover, the above-described polyester polyol having aromatic metal sulfonate group (B) is excellent in hydrolysis resistance and, therefore, contributes to the improvement in storage stability and durability which have been regarded as problems to be solved concerning the conventional aqueous urethane resins.

The content of the polyester polyol having aromatic metal sulfonate group (B) preferably ranges from 5 to 30% by weight based on the solid content of the polyurethane resin, though it also relates to the content of the metal sulfonate group serving as a hydrophilic group. It is also preferable to control the content of the metal sulfonate to 70 to 250 mmol/kg in the polyurethane solid.

When the content of the metal sulfonate group falls within this range, the content of the hydrophilic group is controlled to the optimum level and thus polyurethane particles of polyurethane dispersion remain stable without undergoing agglutination. In this case, moreover, the concentration of the dispersion can be easily elevated and a favorable water resistance can be obtained.

In preparing an aqueous dispersion of the above-described polyurethane resin, an aliphatic polyester polyol is mainly employed as the aliphatic polyol being free from aromatic metal sulfonate group and having a hydroxyl value of from 10 to 350 (C). However, use may be made therefor of aliphatic polyether polyols, aliphatic polycarbonate polyols, etc., either as a single compound or a mixture thereof, or copolymers thereof.

The term "hydroxyl value" as used herein means the amount (expressed in mg) of potassium hydroxide required in neutralizing acetate bonded to an acetylation product obtained from 1 g of an oil sample.

Considering the balance of the adhesive performance, the hydroxyl value of the aliphatic polyol (C) should fall within the range of from 10 to 350.

The aliphatic polyester polyol can be prepared by reacting various publicly known aliphatic (alicyclic) polyol compounds, etc. with various publicly known aliphatic (alicyclic) polycarboxylic acids, etc. or various reactive derivatives thereof by various publicly known methods.

Typical examples of the aliphatic (alicyclic) polyol compounds include aliphatic diols such as ethylene glycol, propylene glycol, 1,3-propanediol, 1,3-butanediol, 1,4-butanediol, 1,5-pentanediol, 1,6-hexanediol, neopentyl glycol, diethylene glycol, triethylene glycol, tetraethylene glycol, dipropylene glycol, tripropylene glycol, polyethylene glycol, 3-methyl-1,5-pentanediol and 2-butyl-2-ethyl-1, 3-propanediol, alicyclic diols such as 1,4-cyclohexanediol, 1,4-cyclohexane dimethanol and hydrogenated bisphenol A, and polyols as polyfunctional components such as glycerol, trimethylolpropane and pentaerythritol. Use may be also made of the following aliphatic (alicyclic) polycarboxylic acids having cyclic lactones such as ε-caprolactone and γ-valerolactone added thereto.

On the other hand, typical examples of the aliphatic (alicyclic) polycarboxylic acids include aliphatic dicarboxylic acids such as succinic acid, succinic anhydride, adipic acid, suberic acid, azelaic acid, sebacic acid, dimeric acid and 1,4-cyclohexanedicarboxylic acid.

As examples of the aliphatic polyether polyol, polymers obtained by ring-opening polymerization of various tricyclic or tetracyclic ether compounds (ethylene oxide, propylene oxide, butylene oxide, styrene oxide, tetrahydrofuran, epichlorohydrin, etc.), either alone or as a mixture of two or more thereof, in the presence of a compound having active hydrogen atom (reactive hydrogen atom) may be cited.

Particular examples of the aliphatic polyether polyol include polyethylene polyol, polypropylene polyol and polytetramethylene polyol.

Moreover, use may be also made of polyether monools partly blocked with monoalcohols such as methanol or butanol, so long as the increase in the molecular weight is not inhibited thereby.

Particularly typical examples of the aliphatic polycarbonate polyol include reaction products obtained by reacting diols (1,3-propanediol, 1,4-butanediol, 1,6-hexanediol, diethylene glycol, polyethylene glycol, polypropylene glycol, polytetramethylene glycol, etc.) with dialkyl carbonates typified by dimethyl carbonate or cyclic carbonates typified by ethylene carbonate.

In order to impart cohesive force and flexibility and reactivate at a low temperature, it is necessary that the aliphatic polyol having a hydroxyl value of from 10 to 350 (C) is used in such an amount as to give 55% by weight or more, preferably from 55 to 85% by weight, of the aliphatic polyol unit based on the solid content of the polyurethane resin in the aqueous dispersion of the polyurethane resin.

In case where the content of the aliphatic polyol unit falls within the range as defined above, the ratio of the soft segment (the aliphatic polyol), which melts at a temperature of about 50 to 60° C., is elevated in the polyurethane resin components. As a result, the adhesive face is vigorously reactivated and thus a favorable adhesive performance is established immediately after bonding.

The polyamine and/or polyol having a molecular weight of 300 or lower (D) to be used in the invention is employed as a chain extender for the low-molecular weight polyurethane resin obtained above. It is necessary that the molecular weight thereof is regulated to 300 or lower so as to enhance the cohesive force of the polyurethane resin. It is also necessary to use a polyamine or a polyol having 2 or more functional groups per molecule so as to elevate the molecular weight of the polyurethane resin and improve its durability. It is therefore unfavorable to use a monoamine or a monohydric alcohol carrying only one functional group per molecule.

Particularly typical examples of the polyamine having a molecular weight of 300 or lower include 1,2-diaminoethane, 1,2- or 1,3-diaminopropane, 1,2-, 1,3- or 1,4-diaminobutane, 1,5-diaminopentane, 1,6-diaminohexane, piperazine, N,N'-bis-(2-aminoethyl) piperazine, 1-amino-3-aminomethyl-3,5,5-trimethylcyclohexane (isophoronediamine), bis-(4-aminocyclohexyl) methane, bis-(4-amino-3-butylcyclohexyl) methane, 1,2-, 1,3- or 1,4-diaminocyclohexane and 1,3-diaminopropane, polyamines such as diethylenetriamine and triethylenetetramine, and hydrazine and hydrazine derivatives such as adipic acid dihydrazide. Moreover, use can be made of sulfonic acid diamine and sodium N-(2-aminoethyl)-2-aminopropionate as described in JP-B-49-36693 and Canadian Patent 928,323.

As the polyol having a molecular weight of 300 or lower, use can be made of the same polyols as cited above for obtaining polyester polyols with the use of polyols having a molecular weight of 300 or lower.

Further, it is possible to use, together with the polyol, a compound having a molecular weight of 300 or lower and carrying amino and hydroxyl group to give two or more functional groups (amino and hydroxyl groups) in total per molecule. Examples of the compound carrying amino and hydroxyl groups in its molecule include aminoalcohols such as ethanolamine, N-methyldiethanolamine, propanolamine, N-methyldiisopropanolamine, N-ethyldiethyleneamine, N-ethyldiisopropanolamine, aminoethylethanolamine and diethanolamine.

Use of the above-described chain extender comprising a polyamine, a polyol, etc. having a molecular weight of 300 or lower makes it possible to enhance the cohesive force of the polyurethane resin and improve the initial heat resistance thereof owing to the increase in the molecular weight.

Typical examples of the organic solvent to be used in preparing the aqueous polyurethane resin dispersion include benzene, toluene, ethyl acetate, acetone, methyl ethyl ketone, diethyl ether, tetrahydrofuran, methyl acetate, acetonitrile, chloroform, methylene chloride, carbon tetrachloride, 1,2-dichloroethane, 1,1,2-trichloroethane, tetrachloroethylene and N-methylpyrrolidone. Either one of these solvents or a mixture thereof may be used. Among all, it is preferable to use acetone or methyl ethyl ketone as a solvent in which polyurethane resins are highly soluble.

It is also possible to use an emulsifier in preparing the aqueous polyurethane resin dispersion. Typical examples of the emulsifier include nonionic emulsifiers of polyoxyethylene polyoxypropylene glycol ether type, polyoxyethylene nonylphenyl ether type, polyoxyethylene octylphenyl ether type, polyoxyethylene lauryl ether type, polyoxyethylene laurate type, polyoxyethylene alkyl ether type, sorbitan derivative type, polyoxyethylene polycyclic phenyl ether type and the like, anionic emulsifiers such as alkylbenzenesulfonic acid type, dialkylsuccinate sulfonate type and the like, cationic emulsifiers and ampholytic emulsifiers.

Among these emulsifiers, it is preferable to use nonionic emulsifiers and anionic emulsifiers. Such an emulsifier may be added at a solid rate of from 0 to 10% by weight based on the polyurethane resin. In case of using such an emulsifier, it is favorable that the emulsifier is added to the polyurethane resin solution or the prepolymer containing isocyanate remaining therein before the emulsification dispersing step followed by the emulsification dispersing. However, it may be added after the completion of the emulsification dispersing step. Either one of these emulsifiers or a mixture thereof may be used.

In the preparation of the aqueous polyurethane resin dispersion, it is also possible to use a catalyst for urethane-formation, if necessary. Typical examples of the catalyst for urethane-formation include various nitrogen-containing compounds such as triethylamine, triethylenediamine and N-methylmorpholine, various metal salts such as potassium acetate, zinc stearate and tin octylate, and various organometallic compounds such as dibutyltin dilaurate.

As will be described hereinafter, the aqueous polyurethane resin dispersions according to the invention can be used alone. Alternatively, it is also possible to use them together with, for example, bifunctional or higher polyisocyanate compounds serving as crosslinking agents. Typical examples of the bifunctional or higher polyisocyanate compounds include polyisocyanate compounds comprising trimers of 1,4-tetramethylene diisocyanate, 1,6-hexamethylene diisocyanate, 4,4'-diisocyanatodiphenylmethane (MDI), xylylene diisocyanate, isophorohe diisocyanate and the like, and compounds having terminal isocyanate composed of these polyisocyanate compounds with low-molecular weight active hydrogen compounds such as ethylene glycol, 1,3-butylene glycol, 1,4-butylene glycol, polyoxyethylene glycol and long-chain higher alcohols.

By using such a crosslinking agent, the aqueous polyurethane resin dispersion can exhibit an improved durability when employed as an adhesive.

The aqueous polyurethane resin dispersions according to the invention are usable as adhesives, sizing agents, fiber-processing agents, coatings, etc. Owing to the long tack-free time (open time), these aqueous polyurethane resin dispersion enable adhesion at a reactivation temperature of 50 to 60° C. after applying on base materials. In addition, these aqueous polyurethane resin dispersions are excellent in adhesive strength and heat resistance, which makes it favorable to use them as adhesives.

The aqueous adhesives according to the invention contain the aqueous polyurethane resin dispersions obtained above.

The aqueous adhesives according to the invention may contain other resins in addition to the polyurethane resins.

As the other resins, use can be made of aqueous resin dispersions of SBR latex resins, acryl emulsions, etc. These resins can be used in such an amount as to give a polyurethane resin content of from 1 to 100% by weight, preferably from 50 to 100% by weight, based on the total solid content.

The aqueous adhesives according to the invention may further contain side components and additives commonly employed in adhesives, so long as the cohesive force thereof are not worsened thereby. Examples of these side components and additives include plasticizers, tackifiers (rosin resin, rosin ester resin, terpene resin, terpene phenol resin, petroleum resin, coumarone resin, etc.), fillers, pigments, thickeners, antioxidants, UV absorbers, surfactants and flame retardants.

The aqueous adhesives according to the invention are appropriately usable in adhering base materials such as shoes, films, metals, foamed matters, rubbers, fibers and various plastics.

EXAMPLES

The present invention will be illustrated in greater detail with reference to the following Examples, but the invention should not be construed as being limited thereto. All the "part(s)" and "%" are given by weight unless otherwise indicated.

The performances of the aqueous polyurethane resin dispersions according to the invention were evaluated by the following methods.

Tack-free Time (open time):

An adhesive comprising an aqueous dispersion of a polyurethane resin was applied with a brush at a rate of 100 g/m$^2$ on PVC sheets (1 mm in thickness×20 mm in width× 300 mm in length) and then reactivated in a hot-air circulatory dryer at 50° C. for 6 minutes. After taking out from the dryer, the time required until the adhesive on the base material faces became tack-free and thus the adhesive faces could not bonded to each other even under pressing with a rubber roller, thereby determining the tack-free time (open time).

Contact Properties:

PVC sheets having an aqueous dispersion of a polyurethane resin applied thereon were bonded to each other. After 1 minute, the adhesive faces were separated by hands and the degree of the cohesive failure was observed. The contact properties were evaluated based on the bite of the adhesives into each other.

G: Due to strong peel resistance, adhesives on both faces of the base materials lengthen at peeling.

F: Due to poor peel resistance, adhesives on both faces of the base materials do not lengthen but peel off.

P: No peel resistance makes peeling easy.

Initial Adhesive Strength:

As in the case of the determination of tack-free time (open time), each adhesive was applied with a brush at a rate of 100 g/m$^2$ on two PVC sheets and then reactivated in a hot-air circulatory dryer at 50° C. for 6 minutes. After taking out from the dryer, the adhesive faces of these PVC base materials were bonded to each other under pressing with a rubber roller. 2 minutes after the bonding, the peel strength was measured with a digital gauge.

Peel Strength with Time:

Using a bonded test piece prepared as in the case of "Initial adhesive strength", the peel strength was measured with the use of a tensile machine 2 hours and 1 days after the bonding. At each time, 180°C. peel strength was measured at a tensile speed of 100 mm/min.

Heat Resistant Creep:

A test piece prepared as in the case of "Initial adhesive strength" was hardened by aging at room temperature for 3 days. After hanging a 1 kg weight, the test piece was put into a hot-air circulatory dryer at 70° C. for 30 minutes to thereby perform a 180° C. creep test. The distance (mm) required for the separation of gauge marks (100 mm) or the time required till the weight dropped was measured.

Preparation Example
Preparation of Polyester Polyol having Aromatic Metal Sulfonate (B):

Into a reactor provided with a thermometer, a nitrogen gas inlet and a stirrer, 1480 parts of dimethyl 5-sulfosodium isophthalate (DMS), 1240 parts of 1,6-hexanediol and 0.5 parts of dibutyltin oxide were fed under supplying nitrogen gas thereto. Then an ester interchange reaction was carried out until the acid value became 1 mgKOH/g or lower by controlling the temperature in the reactor to 180 to 190° C. so as to maintain the column top temperature to 60 to 70° C. Subsequently, the reaction was carried out at 210° C. for 2 hours to give a polyester polyol (1) having a hydroxyl value of 240 mg KOH/g and an acid value of 0.3 mg KOH/g. To this polyester polyol (1) was added 2280 parts of ε-caprolactone and ring-opening polymerization was performed at 180° C. for 3 hours. Thus a polyester polyol (2) having a hydroxyl value of 120 mg KOH/g and an acid value of 0.3 mg KOH/g was obtained (see Table 1).

TABLE 1

| Polyester polyol | (1) | (2) |
| --- | --- | --- |
| Feeding unit (mol) | | |
| DMS (B-1) | 5 | 5 |
| 1,6-hexanediol (B-2) | 10.5 | 10.5 |
| ε-caprolactone (B-3) | — | 20 |
| Hydroxyl value (mg KOH/g) | 240 | 120 |
| Acid value (mg KOH/g) | 0.3 | 0.3 |
| Theoretical metal sulfonate content (mmol/kg) | 2135 | 1080 |

Example 1

To 50 parts of the polyester polyol (1), 100 parts of N-methyl-2-pyrrolidone (NMP) was added and the resultant mixture was thoroughly stirred and dissolved. Then 71 parts of isophorone diisocyanate was added thereto and the mixture was reacted at 80° C. for 2 hours. Next, 204 parts of methyl ethyl ketone was added thereto. After cooling to 60° C., 5 parts of hexamethylene diisocyanate and 330 parts of a polyester (hydroxyl value: 56 mg KOH/g) composed of 1,4-butylene glycol and adipic acid were further added thereto and reaction was carried out at 80° C. When the isocyanate value was lowered to 0.85% or less, the reaction mixture was cooled to 40° C. After adding 460 parts of water, 63 parts of a 10% aqueous solution of piperazine (95% by equivalent as amine based on the residual isocyanate) was added thereto followed by emulsification dispersing. The emulsion thus obtained was desolvated to give an aqueous dispersion having a non-volatile content of 40%.

100 parts of the aqueous dispersion thus obtained was thickened by adding 1 part of SN-Thickener A-812 (manufactured by SANNOPKO). Next, 5 parts of a water-dispersible isocyanate crosslinking agent CR-60N (manufactured by Dainippon Ink and Chemicals) was added thereto to give an adhesive. Subsequently, the adhesive thus prepared was applied with a brush at a rate of 100 g/m² onto two PVC sheets and then the faces of the sheets having the adhesive applied thereto were bonded to each other to evaluate the adhesive performance. As a result, the test piece showed a long tack-free time and excellent adhesive strength, etc.

Example 2

To 30 parts of the polyester polyol (2), 60 parts of methyl ethyl ketone was added and the resultant mixture was thoroughly stirred and dissolved. Then 34 parts of isophorone diisocyanate and 4 parts of hexamethylene diisocyanate were added thereto and the mixture was reacted at 80° C. for 3 hours. Next, 95 parts of methyl ethyl ketone was added thereto. After cooling to 60° C., 5 parts of 1,4-butylene glycol and 160 parts of a polyester (hydroxyl value: 37 mg KOH/g) composed of 1,4-butylene glycol and adipic acid were further added thereto and reaction was carried out at 80° C. When the isocyanate value was lowered to 0.79% or less, the reaction mixture was cooled to 40° C. After adding 280 parts of water and mixing thoroughly, 29.7 parts of a 10% aqueous solution of piperazine (95% by equivalent as amine based on the residual isocyanate) was added thereto followed by emulsification dispersing. The emulsion thus obtained was desolvated to give an aqueous dispersion having a non-volatile content of 50%.

Using the aqueous dispersion thus obtained, an adhesive was prepared as in Example 1. Then, the faces of the sheets having the adhesive applied thereto were bonded to each other to evaluate the adhesive performance. As a result, the test piece showed a long tack-free time and excellent adhesive strength with a high initial adhesive strength.

Example 3

160 parts of a polyester polyol (hydroxyl value: 37 mg KOH/g) composed of 1,4-butylene glycol and adipic acid and 5 parts of 1,4-butylene glycol were added to 60 parts of methyl ethyl ketone and the resultant mixture was thoroughly stirred and dissolved. Then 13 parts of isophorone diisocyanate and 23.5 parts of hexamethylene diisocyanate were added thereto and the mixture was reacted at 80° C. for 3 hours. Next, 100 parts of methyl ethyl ketone was added thereto. After cooling to 60° C., 40 parts of the polyester polyol (2) was further added thereto and reaction was carried out at 80° C. When the isocyanate value was lowered to 0.98% or less, the reaction mixture was cooled to 40° C. After adding 280 parts of water and mixing thoroughly, 38.5 parts of a 10% aqueous solution of piperazine (95% by equivalent as amine based on the residual isocyanate) was added thereto to give an aqueous emulsion. The emulsion thus obtained was desolvated to give an aqueous dispersion having a non-volatile content of 50%.

Using the aqueous dispersion thus obtained, an adhesive was prepared as in Example 1. Then, the faces of the sheets having the adhesive applied thereto were bonded to each other to evaluate the adhesive performance. As a result, the test piece showed a tack-free time of 5 minutes or longer and excellent adhesive strength and heat resistant creep.

Comparative Example 1

An aqueous dispersion of a non-volatile content of 50% was synthesized as in Example 3 but extending the chain with the use of 39.9 parts of a 10% aqueous solution of a mixture of piperazine (piperazine/n-butylamine=9/1 amine equivalent ratio) with n-butylamine (95% by equivalent as amine based on the residual isocyanate) as a substitute for the 10% aqueous solution of piperazine employed in Example 3.

Using the aqueous dispersion thus obtained, an adhesive was prepared as in Example 1. Then, the faces of the sheets having the adhesive applied thereto were bonded to each other to evaluate the adhesive performance. As a result, the test piece showed a long tack-free time but poor contact properties and heat resistant creep.

Comparative Example 2

To 100 parts of the polyester polyol (2), 20 parts of a polyester polyol (hydroxyl value: 37 mg KOH/g) composed of 1,4-butylene glycol and adipic acid and 100 parts of methyl ethyl ketone were added and the resultant mixture was thoroughly stirred and dissolved. Then 30 parts of isophorone diisocyanate was added thereto and the mixture was reacted at 80° C. for 3 hours. When the isocyanate value was lowered to 0.71% or less, the reaction mixture was cooled to 40° C. After adding 450 parts of water and mixing thoroughly, 17.3 parts of a 10% aqueous solution of piperazine (95% by equivalent as amine based on the residual isocyanate) was added thereto to give an aqueous emulsion. The emulsion thus obtained was desolvated to give a translucent aqueous dispersion having a non-volatile content of 30%.

Using the aqueous dispersion thus obtained, an adhesive was prepared as in Example 1. Then, the faces of the sheets having the adhesive applied thereto were bonded to each other to evaluate the adhesive performance. Although the test piece showed a long tack-free time, it showed no contact properties and the adhesive strength was not elevated with the passage of time. It was also poor in heat resistant creep. Thus, no practically usable adhesive was obtained in this case.

Comparative Example 3

To 160 parts a polyester polyol (hydroxyl value: 37 mg KOH/g) composed of 1,4-butylene glycol and adipic acid, 5 parts of 1,4-butylene glycol and 52 parts of methyl ethyl ketone were added and the resultant mixture was thoroughly stirred and dissolved. Then 13 parts of isophorone diisocyanate and 23.5 parts of hexamethylene diisocyanate were added thereto and the mixture was reacted at 80° C. for 3 hours. After adding 87 parts of methyl ethyl ketone, the reaction mixture was cooled to 60° C. Then 7 parts of the polyester polyol (2) was added and reaction was carried out at 80° C. When the isocyanate value was lowered to 1.99% or less, the reaction mixture was cooled to 40° C. After adding 245 parts of water and mixing thoroughly, 67.5 parts of a 10% aqueous solution of piperazine (95% by equivalent as amine based on the residual isocyanate) was added thereto followed by emulsification dispersing. However, no stable particle could be obtained and the emulsion set to gel after desolvation. Namely, no practically usable adhesive could be obtained.

Comparative Example 4

To 160 parts a polyester polyol (hydroxyl value: 37 mg KOH/g) composed of 1,4-butylene glycol and adipic acid, 6 parts of 1,4-butylene glycol and 70 parts of methyl ethyl ketone were added and the resultant mixture was thoroughly stirred and dissolved. Then 75 parts of isophorone diisocyanate was added thereto and the mixture was reacted at 80° C. for 3 hours. After adding 119 parts of methyl ethyl ketone, the reaction mixture was cooled to 60° C. Then 40 parts of the polyester polyol (2) was added and reaction was carried out at 80° C. When the isocyanate value was lowered to 3.13% or less, the reaction mixture was cooled to 40° C. After adding 330 parts of water and mixing thoroughly, 143.3 parts of a 10% aqueous solution of piperazine (95% by equivalent as amine based on the residual isocyanate) was added thereto to give an aqueous emulsion. The emulsion thus obtained was desolvated to give an aqueous dispersion having a non-volatile content of 50%.

Using the aqueous dispersion thus obtained, an adhesive was prepared as in Example 1. Then, the faces of the sheets having the adhesive applied thereto were bonded to each other to evaluate the adhesive performance. As a result, the obtained adhesive was poor in contact properties, adhesive strength and heat resistant creep.

Comparative Example 5

360 parts a polyester polyol (hydroxyl value: 56 mg KOH/g) composed of 1,4-butylene glycol and adipic acid and 2 parts of 1,4-butylene glycol were uniformly molten at 80° C. Then 15 parts of isophorone diisocyanate and 30 parts of hexamethylene diisocyanate were added thereto and the resultant mixture was stirred at 80° C. for 4 hours. When the isocyanate value was lowered to 0.91% or less, the reaction mixture was cooled to 50° C. After slowly adding 800 parts of acetone, 22.9 parts of a 50% aqueous solution of N-(2-aminoethyl)-2-aminoethanesulfonic acid (90% by equivalent as amine based on the residual isocyanate) was added thereto. Subsequently, 500 parts of water was slowly added thereto followed by emulsification dispersing. After desolvating, an aqueous dispersion having a non-volatile content of 40% was obtained.

Using the aqueous dispersion thus obtained, an adhesive was prepared as in Example 1. Then, the faces of the sheets having the adhesive applied thereto were bonded to each other to evaluate the adhesive performance. As a result, the obtained adhesive showed a short tack-free time and a poor resistant creep.

Comparative Example 6

An aqueous dispersion having a non-volatile content of 50% was synthesized as in Example 1 but substituting the polyester polyol (hydroxyl value: 56 mg KOH/g) composed of 1,4-butylene glycol and adipic acid employed in Example 1 by another polyester polyol (hydroxyl value: 56 mg KOH/g) composed of 1,4-butylene glycol and isophthalic acid. Using the aqueous dispersion thus obtained, an adhesive was prepared as in Example 1. Then, the faces of the sheets having the adhesive applied thereto were bonded to each other to evaluate the adhesive performance. As a result, the obtained adhesive showed a high heat activation temperature and a poor adhesive strength after bonding.

TABLE 2(1)

| Composition ratio | Example | | | Comp. Example | | |
|---|---|---|---|---|---|---|
| | 1 | 2 | 3 | 1 | 2 | 3 |
| Polyisocyanate | | | | | | |
| HDI | 5 | 4 | 23.5 | 23.5 | | 23.5 |
| IPDI | 71 | 34 | 13 | 13 | 30 | 13 |
| Polyol | | | | | | |
| Butylene adipate (OH value 56) | 330 | | | | | |
| Butylene adipate (OH value 37) | | 160 | 160 | 160 | 20 | 160 |
| 1,4-Butylene glycol | | 5 | 5 | 5 | | 5 |
| Polyol (1) | 50 | | | | | |
| Polyol (2) | | 30 | 40 | 40 | 100 | 7 |
| Solvent  NMP | 100 | | | | | |
| MEK | 204 | 155 | 160 | 160 | 100 | 139 |
| Amino compound | | | | | | |
| 10% aq. soln. of piperazine | 63 | 29.7 | 38.5 | | 17.3 | 67.5 |
| 10% aq. soln. of piperazine/ n-butylamine | | | | 39.9 | | |
| Water | 460 | 280 | 280 | 280 | 450 | 245 |
| Polyol (C) content (%) | 71.4 | 67.8 | 65.2 | 65.2 | 13.2 | 74.3 |

TABLE 2(1)-continued

|  | Example | | | Comp. Example | | |
| --- | --- | --- | --- | --- | --- | --- |
| Composition ratio | 1 | 2 | 3 | 1 | 2 | 3 |
| Isocyanate content (%) | 16.4 | 16.1 | 14.9 | 14.9 | 19.8 | 17.0 |
| SO₃Na content (mmol/kg) | 231 | 137 | 176 | 176 | 712 | 35 |

TABLE 2(2)

|  | Example | | | Comp. Example | | |
| --- | --- | --- | --- | --- | --- | --- |
|  | 1 | 2 | 3 | 1 | 2 | 3 |
| (Adhesive performance) Tack-free time (min) | ≧5 | 5 | ≧5 | ≧5 | ≧5 | Set to gel |
| Contact properties | G | G | G | G-F | P |  |
| Initial adhesive strength (N/20 mm) | 49 | 59 | 57 | 25 | 7 |  |
| Adhesive strength with time |  |  |  |  |  |  |
| After 2 h (N/20 mm) | 59 | 61 | 59 | 43 | 7 |  |
| After 1 day (N/20 mm) | 88 | 92 | 88 | 66 | 9 |  |
| Heat resistant creep (mm) | 60 | 55 | 47 | Drop 5.5 min | Drop 5 sec |  |

TABLE 3(1)

|  | Comp. Example | | |
| --- | --- | --- | --- |
| (Composition ratio) | 4 | 5 | 6 |
| Polyisocyanate |  |  |  |
| HDI |  | 30 | 5 |
| IPDI | 75 | 15 | 71 |
| Polyol |  |  |  |
| Butylene adipate (OH value 56) |  | 360 |  |
| Butylene adipate (OH value 37) | 160 |  |  |
| Butylene adipate (OH value 22) |  |  |  |
| Butylene isophthalate (OH value 56) |  |  | 330 |
| 1,4-Butylene glycol | 6 | 2 |  |
| Polyol (1) |  |  | 50 |
| Polyol (2) | 40 |  |  |
| Solvent |  |  |  |
| NMP |  |  | 100 |
| Acetone |  | 800 |  |
| MEK | 189 |  | 204 |
| Amino compound |  |  |  |
| 10% aq. soln. of piperazine | 143.3 |  | 63 |
| 50% aq. soln. of N-(2-aminoethyl)-2-aminoethanesufonic acid |  | 22.9 |  |
| Water | 330 | 500 | 460 |
| Polyol (C) content (%) | 54.2 | 86.0 | 71.4 |
| Isocyanate content (%) | 25.4 | 10.8 | 16.4 |
| SO₃Na content (mmol/kg) | 146 | 95 | 231 |

TABLE 3(2)

|  | Comp. Example | | |
| --- | --- | --- | --- |
|  | 4 | 5 | 6 |
| (Adhesive performance) Tack-free time | 10 sec | 2 min | 0 min |
| Contact properties | P | G | P |
| Initial adhesive strength (N/20 mm) | 19 | 44 | 0 |
| Adhesive strength with time |  |  |  |
| After 2 h (N/20 mm) | 25 | 84 | 0 |
| After 1 day (N/20 mm) | 30 | 106 | 0 |
| Heat resistant creep (mm) | Drop 2.5 min | 89 | Drop 1 min |

The aqueous dispersions of polyurethane resins according to the invention have long tack-free time (open time), high initial adhesive strength and high adhesive strength with the passage of time and excellent durability such as heat resistance, which makes them useful in aqueous adhesives.

While the invention has been described in detail and with reference to specific examples thereof, it will be apparent to one skilled in the art that various changes and modifications can be made therein without departing from the spirit and scope thereof.

What is claimed is:

1. An aqueous dispersion of a polyurethane resin obtained by reacting a mixture comprising:

(A) an organic polyisocyanate;
   (B) a polyester polyol containing an aromatic metal sulfonate group; and
   (C) an aliphatic polyol being free from aromatic metal sulfonate and having a hydroxyl value of from 10 to 350, and then reacting the reacted mixture with (D) at least one member selected from the group consisting of polyamines and polyols each having a molecular weight of 300 or lower for chain extension, wherein the content of said aliphatic polyol unit (C) amounts to at least 55% by weight based on the solid content of said polyurethane resin.

2. The aqueous dispersion of a polyurethane resin according to claim 1, wherein said polyester polyol (B) is obtained by using a sulfonate-free polycarboxylic acid and/or cyclic ester as reactant(s).

3. The aqueous dispersion of a polyurethane resin according to claim 1, wherein the content of said metal sulfonate ranges from 50 to 700 mmol/kg based on the solid content of said polyurethane resin.

4. An aqueous adhesive comprising an aqueous dispersion of a polyurethane resin according to any of claims 1 to 3.

* * * * *